United States Patent [19]
Gaborski et al.

[11] Patent Number: 5,479,523
[45] Date of Patent: Dec. 26, 1995

[54] CONSTRUCTING CLASSIFICATION WEIGHTS MATRICES FOR PATTERN RECOGNITION SYSTEMS USING REDUCED ELEMENT FEATURE SUBSETS

[75] Inventors: Roger S. Gaborski; Peter G. Anderson, both of Pittsford; David G. Tilley, Fairport; Christopher T. Asbury, Rochester, all of N.Y.

[73] Assignee: Eastman Kodak Company, Rochester, N.Y.

[21] Appl. No.: 214,935

[22] Filed: Mar. 16, 1994

[51] Int. Cl.$^6$ .................................................... G06K 9/62
[52] U.S. Cl. ........................ 382/159; 382/190; 382/224
[58] Field of Search .............................. 382/14, 15, 16, 382/21, 23, 36, 159, 161, 190, 224, 225

[56] References Cited

U.S. PATENT DOCUMENTS

| | | | |
|---|---|---|---|
| 4,773,099 | 9/1988 | Bokser | 382/14 |
| 4,933,977 | 6/1990 | Ohnishi et al. | 382/9 |
| 5,034,989 | 7/1991 | Loh | 382/13 |
| 5,050,219 | 9/1991 | Maury | 382/3 |
| 5,050,222 | 9/1991 | Lee | 382/21 |
| 5,058,182 | 10/1991 | Kuan et al. | 382/25 |
| 5,060,279 | 10/1991 | Crawfort et al. | 382/14 |
| 5,101,439 | 3/1992 | Kiang | 382/9 |
| 5,113,452 | 5/1992 | Chatani et al. | 382/13 |
| 5,121,441 | 6/1992 | Chefalas et al. | 382/13 |
| 5,123,057 | 6/1992 | Verly et al. | 382/37 |

OTHER PUBLICATIONS

Copending U.S. Patent Application Ser. No. 07/931,741—Filed on Aug. 18, 1992, assigned to Eastman Kodak Comany, invented by Peter G. Anderson.

Uma Shrinivasan, "Polynomial Discriminant Method For Hand Written Digit Recognition", State University of New York at Buffalo, Technical Report, Dec. 14, 1989.

David E. Goldberg, "Genetic Algorithms in Search, Optimization, and Machine Learning", 1989, pps. ix–xiii and 1–25.

The Handbook of Genetic Algorithms, 1991, pp. 1 . 53.

Roger S. Gaborski et al., "Genetic Algorithm Selection of Features for Handwritten Character Identification" May 24, 1994.

*Primary Examiner*—Leo H. Boudreau
*Assistant Examiner*—Phuoc Tran
*Attorney, Agent, or Firm*—Raymond L. Owens

[57] ABSTRACT

Methods and apparatus for constructing a classification weights matrix for a pattern recognition system are provided which enable large system feature sets to be reduced and yield at least the same level of performance achieved using the large feature set. Methods and apparatus are also described for determining (evaluating) the classification efficiency of selected subsets of a given feature set. Further aspects of the invention are directed to: (a) methods and apparatus for constructing reduced element classification weights matrices utilizing a genetic search process to find the subset having a maximum classification efficiency; and (b) pattern recognition systems (including, in particular, character identification systems), which utilize classifiers constructed in accordance with the aforementioned aspects of the invention to actually perform pattern recognition.

25 Claims, 5 Drawing Sheets

|  | Population size | | |
|---|---|---|---|
| parent competition | 100 | 200 | 300 |
| best of 2 | 3,700 | 16,000 | 25,000 |
| best of 3 | 3,300 | 9,100 | 18,000 |
| best of 4 | 1,450 | 4,850 | 10,900 |
| best of 5 | 1,400 | 4,650 | 9,200 |

FIG. 3A

|  | Population size | | |
|---|---|---|---|
| parent competition | 100 | 200 | 300 |
| best of 2 | 9837 | 9893 | 9901 |
| best of 3 | 9841 | 9884 | 9894 |
| best of 4 | 9793 | 9845 | 9872 |
| best of 5 | 9802 | 9856 | 9876 |

FIG. 3B

|  | MUTATE_COUNT | | | |
|---|---|---|---|---|
| parent competition | 0 | 3 | 6 | 9 |
| best of 4 | 9793 | 9809 | 9802 | 9800 |
| best of 5 | 9802 | 9802 | 9827 | 9804 |

CONSTRUCTING CLASSIFICATION WEIGHTS MATRICES FOR PATTERN RECOGNITION SYSTEMS USING REDUCED ELEMENT FEATURE SUBSETS

BACKGROUND OF THE INVENTION

1. Field of the Invention

The present invention relates generally to pattern recognition systems such as those used to recognize hand printed and/or machine printed letters and digits (e.g., alphanumeric characters appearing on fill-in-the-blank forms), face or fingerprint identification systems, sonar systems, etc.

More particularly, the invention relates to methods and apparatus for constructing a classification weights matrix for a pattern recognition system which enables a relatively large given feature set for the system (e.g., a 1,500 element set); to be reduced (for example, to a 300 element set) and yield at least the same level of performance as achieved by the system when using the given feature set.

According to a further aspect of the invention, methods and apparatus are described for determining (evaluating) the classification efficiency of selected subsets of a set of features in a given pattern recognition system.

Still further, the invention is directed to methods and apparatus for constructing the aforementioned classification weights matrix utilizing a genetic search process to find a subset having maximum classification efficiency.

Further yet, the invention is directed to pattern recognition systems (including, in particular, character identification systems), which utilize classifiers constructed in accordance with the aforementioned aspects of the invention to actually perform pattern recognition.

2. Description of the Related Art

As indicated hereinabove, pattern recognition systems may be used for a variety of purposes and may take many different forms. Without intending to limit the scope or spirit of the present invention, but rather for the sake of illustrating the principals thereof, the focus of the description that follows will be on optical character recognition ("OCR") systems used to recognize hand printed and/or machine printed letters and digits. The same principals will be recognized by those skilled in the art as equally applicable to other types of pattern recognition systems.

Conventional methods of character pattern recognition, whether of machine printed characters or hand printed characters, fall into many classes including neural network based recognizers and statistical classifiers as well as template matching and stroke based methods.

Neural network based systems are characterized by plural nonlinear transfer functions which vary in accordance with some learning method, such as back propagation. The neural networks typically evolve discrimination criteria through error feedback and self organization. Because plural transfer functions are used in the educated recognition system, neural networks are not very well suited for implementation on general purpose computers and generally need dedicated special purpose processors or dedicated node hardware in which each of the transfer functions is implemented.

On the other hand, statistical based classifiers are more suited for implementation on general purpose computers. Statistical classifiers can be implemented using a number of different statistical algorithms. These algorithms generally deal with selected features of the characters and analytically determine whether the features belong to or are members of clusters of features which clusters define characteristics of the characters being recognized. In other words, if the features of an unlabeled character fall within the boundaries of a cluster of features which characterize a particular text character, then the probability is high that the character to be labeled corresponds to the character of the cluster.

One approach, which is pixel-based, to identifying whether an unlabeled character falls within a cluster boundary is to compute the Hamming distance between an unlabeled character pixel array and the arrays of possible matching text characters. Another approach, which is feature-based, is to use a polynomial least mean square classifier with a quadratic discriminant function, such as described in Uma Shrinivasan, "Polynomial Discriminant Method For Hand Written Digit Recognition", State University of New York at Buffalo, Technical Report, Dec. 14, 1989, incorporated by reference herein.

The Shrinivasan classifier works as follows. A database of labeled, hand written alphanumeric characters (digits, upper case alphabetics, or the combination of the two) are converted to feature vectors, $\bar{v}$, and are associated with target vectors. The components of the feature vectors are F quadratic polynomials (features) formed from the character's pixel array to provide evidences of lines through the image. The target vector for each character is a standard unit vector $\bar{e}_{k(\bar{v})}$ with the $k(\bar{v})^{th}$ component equal to 1 and all other components equal to zero, where k(v) is the externally provided classification for the character, for example 0,1,2, . . . ,9 or A,B, . . . ,Z or a combination. Standard numerical techniques are used to determine an F×K floating point weight matrix A to minimize the squared error sum, $\epsilon_{\bar{v}}(A\bar{v}-\bar{e}_{k(v)})^2$, where the sum runs over all feature vectors in a training set, and K is the number of classes, for example, K= 10 for digits or K=26 alphabetics.

The weights matrix, A, is then used to classify unlabeled characters by determining the largest component in the product $A\bar{w}$, where $\bar{w}$ is the unknown character's feature vector. Additional details of this method can be found in the above-identified paper which includes source code implementing the method.

The above described system along with other statistically based systems, such as described in U.S. Pat. No. 5,060,279, are one shot learning systems, that is, the weight matrix or equivalent database is created in a single pass over the set of labeled characters used to produce the matrix or database. Such statistically based classifiers provide a reasonably good classification system but generally do not have the accuracy of neural network systems. However, the more accurate neural network based systems are slower to learn, slower to identify characters and require more memory and computing hardware than the statistical classifiers.

A system which combines the advantageous accuracy of the neural network based systems with the speed and efficiency of the statistically based systems and which may be based on simple integer or bit arithmetic, is described in copending U.S. patent application Ser. No. 07/931,741, filed Aug. 18, 1992, assigned to the same assignee as the present invention. The aforementioned copending patent, entitled "Supervised Training Augmented Polynomial Method And Apparatus For Character Recognition", invented by Peter G. Anderson, is hereby incorporated by reference.

The incorporated copending patent application describes a system that creates a classification matrix, which classifies or identifies hand printed or machine printed alphanumeric characters, using an iterated least squares polynomial discriminant method.

During iteration the classification weight matrix, to be subsequently used for identification, is modified by determining which characters are incorrectly classified, or classified with too small a confidence, and replicating those characters during training to strengthen the correct classification. The correct classification is also strengthened by using negative feedback, or subtracting out of the misclassified target vectors, to inhibit an incorrect classification.

The speed of the learning process is enhanced by subsampling the training data during feature vector extraction, supersampling (that is, artificially enlarging) the training set and stepwise increasing the amount of the training set used, maintaining intermediate matrices and step wise increasing the amount of each feature vector used during training.

Classification accuracy is enhanced by using features of at least two types, both based on quadratic monomials of the pixels called King and Knight features (so called because they resemble the squares in a chess board the respective piece moves to and from). The memory efficiency utilization is enhanced by modifying the existing weight matrix and compressing the sparse binary features vectors.

Although describing an alternative to the one shot learning systems referred to hereinabove to improve classification accuracy (thru training) and suggesting the maintenance and use of intermediate matrices to develop improved classifiers, etc.; the classifier development technique taught in the aforementioned incorporated copending patent application uses a (binary) vector of 1,500 features, based on an equidistributed collection of products of pixel pairs, to form the linear discriminator used for character recognition.

As a result of using such large vectors, the processes taught in the aforementioned incorporated copending patent application (and the incorporated reference as well), require time consuming and computer resource consuming matrix manipulation steps (e.g., computing the inverse of a 1,500× 1,500 matrix), each time a new classifier is built and evaluated.

Furthermore, although the classifier taught in the incorporated copending patent application is qualitatively competitive with, and is faster to train and to run than many classification alternatives known in the prior art; the 1,500-member feature set clearly contains many redundant (overlapping or useless) members.

Accordingly, it would be desirable to provide methods and apparatus for constructing a classification weights matrix for a pattern recognition system based on a significantly smaller set of features than is presently required by competitive prior art pattern recognition techniques as exemplified by the techniques taught in the incorporated references.

A significantly smaller feature set (for example, 300 versus 1,500 features), would be very desirable for faster training purposes, to allow faster and smaller application programs to be developed, and to facilitate hardware implementation of such smaller systems if desired. Furthermore, systems using a "small" set of features would also be less likely to allow a system to overfit the training data by memorizing noise in the training data, compared with systems that require a "large" feature set and for this reason are desirable as well.

Additionally, it would be desirable to provide methods and apparatus for not only creating, but for also judiciously selecting and evaluating reduced feature sets used to construct small classifiers, i.e., methods and apparatus that identify the subsets that work particularly well in building classifiers using only the small set of extracted features from a given feature set.

In particular, it would be desirable to provide methods and apparatus for constructing classification weights matrices for pattern recognition systems that, utilizing a reduced feature set, achieve correct classification rates comparable to (or better than) those rates attainable using the aforementioned prior art techniques.

Furthermore, it would be desirable to be able to determine which subset of a given feature set to use in order to construct one of the aforementioned desirable classification weights matrices, where the determination of which subset to use (i.e., which reduced feature set) is based on the objective criteria used in searching the space of possible feature subsets.

Further yet, it would be desirable to provide methods and apparatus for allowing the space of f-element subsets of a set of F features, where f<F, to be efficiently searched (deterministically or heuristically), to find a f-element subset having a maximum "classification efficiency", where classification efficiency is defined as the percent of correct classifications made on a predetermined set of exemplars. The "maximum" discovered could be the maximum in fact, or the maximum as determined after searching for a predetermined period of time, the maximum exceeding a predetermined threshold, etc.

It would also be desirable to be able to provide methods and apparatus for constructing classification weights matrices which are defined in terms of other matrices: (a) which may be readily constructed utilizing prior art techniques, such as those described in the incorporated references; and (b) which are relatively easy to manipulate by virtue of their being constructed utilizing the aforementioned, reduced size, feature subset having a maximum classification efficiency.

Further still, it would be desirable to provide pattern recognition systems (including, in particular, character identification systems), which utilize classifiers constructed in accordance with the aforementioned aspects of the invention to actually perform pattern (e.g., character) recognition.

SUMMARY OF THE INVENTION

Accordingly, it is an object of the invention to provide methods and apparatus for constructing a classification weights matrix for a pattern recognition system based on a significantly smaller set of features than is presently required by competitive pattern recognition techniques.

Furthermore, it is an object of the invention to provide pattern recognition systems which are faster and easier to train and which are realizable using smaller applications programs which facilitate hardware implementations.

Still further, it is an object of the invention to provide pattern recognition systems which are less likely to memorize noise in training data, compared with systems that require the use of a "large" feature set to achieve acceptable performance.

Additionally, it is an object of the invention to provide methods and apparatus for selecting and evaluating reduced feature sets which work particularly well in building classifiers having acceptable predetermined performance characteristics.

In particular, it is an object of the invention to provide methods and apparatus for constructing classification weights matrices for pattern recognition systems that, utilizing a reduced feature set, achieve correct classification rates comparable to (or better than) those rates attainable using the aforementioned prior art techniques.

Yet another object of the invention is to provide techniques for determining which subset of a given feature set to use to construct a classification weights matrix, where the determination is based on objective criteria used to search the possible feature subset space.

It is yet a further object of the invention to provide methods and apparatus for allowing the space of f-element subsets of a set of F features, where f<F, to be efficiently searched (deterministically or heuristically), to find a f-element subset having a maximum "classification efficiency", where classification efficiency is defined as the percent of correct classifications made on a predetermined set of exemplars.

Still another object of the invention is to provide methods and apparatus for constructing classification weights matrices which are defined in terms of matrices which themselves may be readily constructed and are relatively easy to manipulate by virtue of their being formed utilizing the aforementioned, reduced size, feature subset having a maximum classification efficiency.

Further still, it is an object of the present invention to provide pattern recognition systems (including, in particular, character identification systems), which utilize classifiers realizing the aforementioned objectives, to actually perform pattern (e.g., character) recognition.

According to a first aspect of the invention, a method (and corresponding apparatus), for constructing a classification weights matrix A' for a pattern recognition system, comprises the steps of: (a) providing a digital computer with a first set of signals representing a correlation matrix Z between a predetermined set of exemplar feature vectors, each representing the values of a predefined set of F features, and a set of classification target vectors corresponding to the feature vectors; (b) providing the digital computer with a second set of signals representing the autocorrelation matrix W of the set of exemplar feature vectors; (c) determining the classification efficiency of selected subsets of the set of F features, wherein the step of determining the classification efficiency for a given subset comprises the steps of: (c1) utilizing the given subset to construct submatrices of the correlation and autocorrelation matrices; (c2) forming a weights matrix for a linear discriminator, in the vector space of the given subset of features, as a function of the submatrices, and (c3) testing the linear discriminator weights matrix on a predefined set of exemplars to yield the classification efficiency of the given subset; (d) searching the space of f-element subsets of the set of F features, where f is prespecified and less than F, for an f-element subset having a maximum classification efficiency; (e) selecting one of the f-element subsets in the space, S, as having a maximum classification efficiency as a result of the step of searching; and (f) defining the classification weights matrix A' as the product of submatrix Z' of the correlation matrix Z, and the inverse of submatrix W' of the autocorrelation matrix W, where submatrices Z' and W' are constructed as a function of S.

According to one embodiment of the invention the matrices Z and W are constructed utilizing an iterated supervised training process, although other techniques, such as the one shot approach taught in the incorporated reference, are also contemplated by the invention.

According to a preferred embodiment of the invention the search referred to hereinabove (at step (d)), is performed utilizing a genetic search process. Once again, however, other techniques for performing the step (d) search, such as searching deterministically, are contemplated by the invention.

According to a second aspect of the invention, a method (and corresponding apparatus), for classifying an unclassifed pattern input to a pattern recognition system that includes a digital computer, comprises the steps of: (a) providing the unclassified pattern to the digital computer in a normalized form; (b) constructing, utilizing the digital computer, a classification weights matrix A' for the pattern recognition system in accordance with the steps set forth hereinbefore relating to the aforementioned first aspect of the invention; and (c) applying A' to the normalized unclassified pattern provided to the computer system to classify the pattern.

According to a further aspect of the invention a method for determining the classification efficiency of selected subsets of a set of F features in a pattern recognition system that includes a digital computer provided with a first set of signals representing the correlation matrix Z between a predetermined set of exemplar feature vectors, each representing the values of the predefined set of F features, and a set of classification target vectors corresponding to the feature vectors, and a second set of signals representing the autocorrelation matrix W of the set of exemplar feature vectors, comprises the steps of: (a) utilizing a given one of the selected subsets to construct submatrices of the correlation and autocorrelation matrices; (b) forming a weights matrix for a linear discriminator, in the vector space of the given subset of features, as a function of the submatrices, and (c) testing the linear discriminator weights matrix on a predefined set of exemplars to yield the classification efficiency of the given subset.

The aforementioned first aspect of the invention may be alternatively characterized as a method for constructing a classification weights matrix A' for a pattern recognition system that includes a digital computer provided with (a) a first set of signals representing a correlation matrix Z between a predetermined set of exemplar feature vectors, each representing the values of a predefined set of F features, and a set of classification target vectors corresponding to the feature vectors, and (b) a second set of signals representing the autocorrelation matrix W of the set of exemplar feature vectors, comprising the steps of: (a) forming an initial population of P individuals, wherein each individual is a randomly chosen f-element subset of the predetermined set of the set of F features, where f<< F; (b) evaluating the fitness (classification accuracy) of each individual subset; (c) determining if a stopping condition has been met based on the evaluated fitness of each individual; (d) defining, whenever a stopping condition has been met, the individual subset S that satisfies a stopping condition as the most fit individual; and (e) defining the classification weights matrix A' as the product of submatrix Z' of the correlation matrix Z, and the inverse of submatrix W' of the autocorrelation matrix W, where submatrix Z' is an array whose columns are f of the F columns of Z selected by subset S, and where submatrix W' is an array whose rows and columns are, similarly, the f rows and f columns of the F×F matrix W selected by subset S.

One embodiment of the alternative characterization of the aforementioned first aspect of the invention, further includes the step of iteratively performing, so long as one of a set of search termination conditions has not been met, a search, over the space of f-element subsets of the predetermined set of the set of F features, for an individual which satisfies a stopping condition; where the set of search termination conditions include stopping conditions that are based on the evaluated fitness of an individual, along with stopping conditions (such as computer resource or time related stopping conditions), that are not based on the evaluated fitness of an individual.

Another embodiment of the alternative characterization of the aforementioned first aspect of the invention, further includes the steps of performing the requisite search using a genetic search process comprising the steps of: (a) randomly selecting two disjoint sets of individuals, each consisting of N individuals, where N is much less than P, to determine the most fit individual in each disjoint subset to serve as parents in the genetic search; (b) determining the most fit individual in each disjoint subset to serve as parents; (c) forming two children from the parents determined in step (b) to be most fit; (d) evaluating the fitness of the children; and (e) entering the new children into the population displacing the two least fit individuals thereby maintaining the population at fixed size P.

Yet another embodiment of the alternative characterization of the aforementioned first aspect of the invention, further includes the step of performing the aforementioned genetic search process by including the step of mutating the children prior to performing the step (step (d)) of evaluating the fitness of the children.

The invention may be applied to construct and/or improve the performance of many types of pattern recognition systems such as optical character recognition, sonar detection and finger, face or voice print identification systems.

Features and advantages of the invention include: the provision of a small classifier, namely one which works with a small set of extracted features, that can be created, trained (if desired) and be evaluated rapidly; the utilization of a genetic search procedure to rapidly locate a feature subset whose performance matches that of a given full feature set; the ability to allow faster and smaller application programs to be developed and implemented in hardware (if desired); the provision of pattern recognition systems less likely to memorize noise in the training data when compared with systems that require a "large" feature set; the ability to construct small and efficient classification weights matrices which are defined in terms of other matrices which may be readily constructed utilizing prior art techniques and which are relatively easy to manipulate; and the ability to provide pattern recognition systems (including, in particular, character identification systems), which utilize classifiers constructed in accordance with the aforementioned aspects of the invention to actually perform pattern (e.g., character) recognition.

These and other objects, embodiments and features of the present invention and the manner of obtaining them will become apparent to those skilled in the art, and the invention itself will be best understood by reference to the following Detailed Description read in conjunction with the accompanying Drawing.

DETAILED DESCRIPTION

As indicated hereinbefore, for the sake of illustrating the principals of the invention, without intending to limit the scope or spirit thereof, the focus of the description that follows will be on optical character recognition ("OCR") systems used to recognize hand printed and/or machine printed letters and digits.

The need for the present invention in the context of an optical character recognition system is clear. A massive amount of forms is in general use in all areas of life: businesses, academia, and government. The data on these forms must be transformed to machine-readable form for automatic data processing and archival. Human data entry operators perform the bulk of this task now, with attendant problems such as: repetitive motion injuries, job stress, errors caused by fatigue, etc. Accordingly, the task must be relegated to automation.

Because of the massive amount of application, it is necessary to make the OCR system as fast as possible. This may be aided by hardware implementation, which requires that the processing algorithm be as compact as possible.

As previously noted with reference to the prior art, many OCR systems take the form of statistical pattern recognition systems and neural networks which tend to be very large, take a long time to be properly programmed (trained), and employ continuous nonlinear functions, such as hyperbolic tangent. The pertinent features (usually evolved through a supervised training session) form a huge set. Both of these qualities mitigate against hardware implementation of the OCR.

As further indicated hereinbefore, the present invention presents a technique for reducing the feature set of an OCR system. For example, where the original number of features needed to classify hand-printed digits was 1,500; an illustrative system created using the feature set reduction method of the present invention reduced the number to 300 with equivalent recognition performance.

The type of classifier that the present invention works with is a linear discriminator, which classifies patterns by means of a matrix multiplication applied to a vector of the pattern's features. Specifically, the matrix may, for example, be created via a pseudoinverse as described in the incorporated reference; or, by way of further example, be created by an iterated version of the pseudoinverse as described in the previously incorporated copending patent application.

It may be useful to keep in mind an overview of the basic principals employed in a preferred embodiment of the invention (to achieve the aforestated desirable results), while reviewing the details of the invention as set forth hereinafter.

According to a preferred embodiment of the invention, a genetic search process is employed (keeping in mind that other search processes may be used as well), to search the space of subsets of a specified size (e.g., 300) of the set of all (e.g., 1,500) features, creating a classifier system based upon those features, and evaluating the subset using the performance accuracy of the resulting classifier on a set of testing exemplars.

The iterated pseudoinverse training process taught in the incorporated copending patent application produces a weights matrix of the form $A=ZW^{-1}$ (A is the matrix which multiplies the features vector for classification), where the matrices Z and W are determined via an iterative training algorithm that may take hours to days.

Z is a correlation matrix of features vectors with associated classification vectors, and W is the autocorrelation matrix of the features vectors. Z and W may be saved at the end of a training session and submatrices of these can be formed corresponding to the chosen subsets of the set of features. In this manner, a new A matrix (generally referred to hereinafter as A') can be immediately formed to build a classifier corresponding to the features subset, and that classifier can be quickly evaluated.

Figure 1:
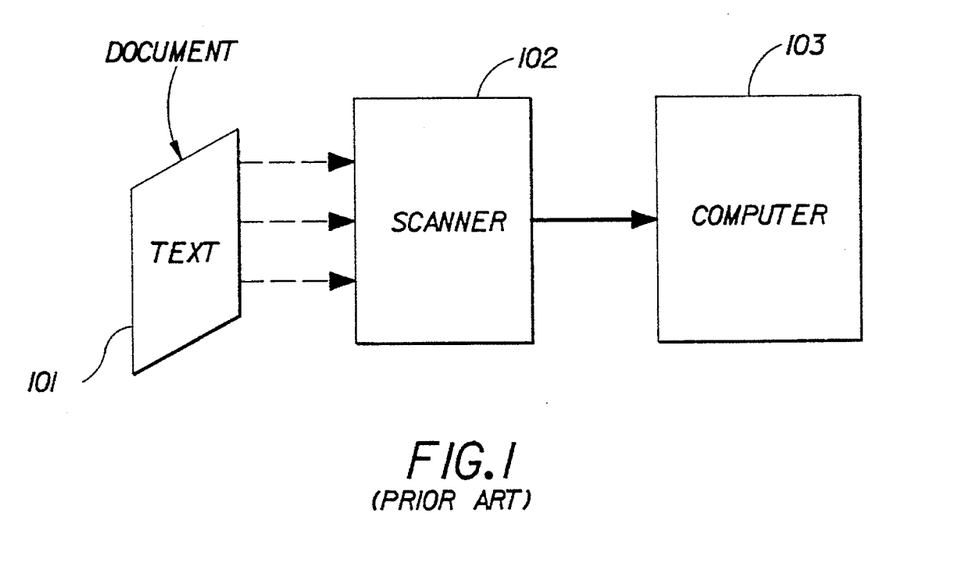
FIG. 1 depicts a prior art pattern recognition system, in particular the combination of an optical scanner and a programmable digital computer used for performing character recognition, in which the invention may be advantageously practiced.

With this overview of the invention in mind, reference should now be made to FIG. 1 which depicts a prior art pattern recognition system, 100, in which the invention may be advantageously practiced.

In particular, FIG. 1 depicts the combination of an optical scanner, 102; and a programmable digital computer, 103, used for performing character recognition when programmed, for example, in accordance with the teachings of the reference or copending patent application incorporated herein. Scanner 102, which serves as a device for inputting a set of characters to be identified by the OCR system (stored, for example, on an original document 101), is shown coupled to programmable digital computer 103.

As a result of the prior art teachings referred to hereinbefore, it can be assumed hereinafter that the text input to the illustrative OCR in which the invention is being described broken down into lines of text and ultimately individual normalized characters (for example, on a 30×20 pixel grid), which can be further analyzed (in accordance with the teachings of the invention) to identify individual characters.

The exemplary prior art OCR system depicted in FIG. 1, which is suitable for practicing the present invention, may be realized using commercially available devices that are well known to those skilled in the art.

For example, a Kodak ImageLink Scanner may serve as a suitable scanner 102 to provide computer 103 with input representations of the characters to be analyzed.

An example of suitable programmable digital computing system (digital computer 103 in FIG. 1) which may be utilized to practice the invention, when programmed in accordance with the teachings of the invention as set forth hereinafter, include a Sun Sparcstation II computer.

A first detailed description of the invention will now be set forth in the context experiments performed to develop the feature set reduction techniques contemplated herein. Results of the various experiments are depicted in the graphs and Tables to be explained hereinafter with reference to FIGS. 2–4.

Figure 5:
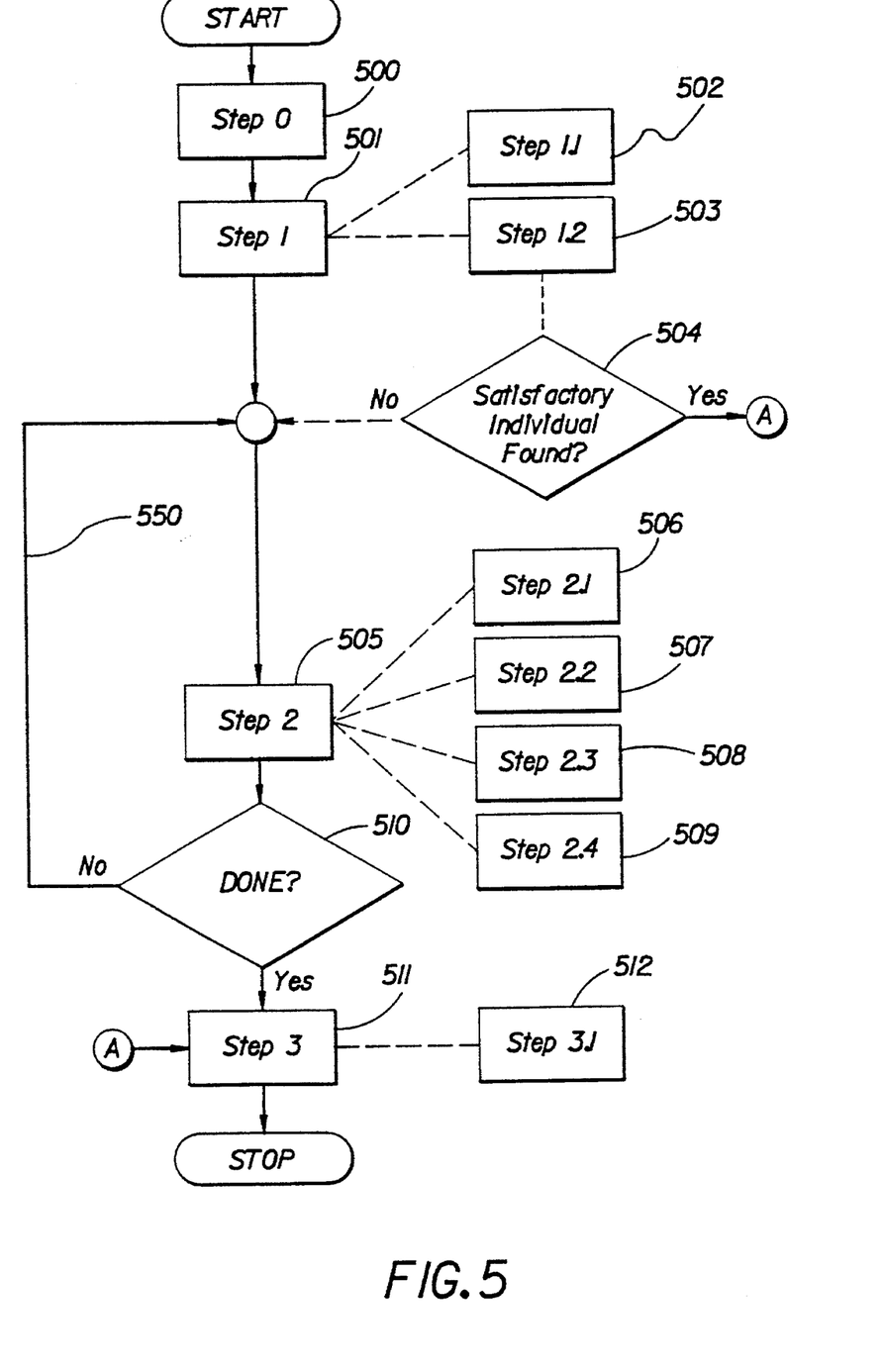
FIG. 5 depicts, in the form of a flow chart, an illustrative process for constructing the weights matrix A' in accordance with the teachings of the invention.

Following this first description of the invention, an alternate characterization will be presented with reference to FIG. 5, where a process applying a genetic search to determine a reduced feature set (and for constructing a corresponding weights matrix), meeting the objectives of the invention, is described.

Starting with a hand-written digit recognition algorithm, with a 97%–99% correct recognition rate, which functions as a linear discriminator based on a collection of 1,500 binary features extracted from a 30×20-pixel array, the object of the experiments described herein was to determine some f-element subsets (e.g., 100, 200, 300, elements, etc.) of those 1,500 features, and build a new classifier which also achieved the same recognition rate as the system utilizing all 1,500 features.

As indicated hereinbefore, the smaller feature set is desirable for run-time space and speed of the algorithm as well as for potential hardware implementation, as suggested in a publication entitled "A Hardware Polynomial Feature Net For Handprint Digit Recognition", by Rao et al., published in the Proceedings of the Third IEE Annual Conference On Artificial Neural Networks, 1993.

Additionally, as previously mentioned herein, a smaller feature set would not so easily over-fit the training exemplars ("memorize the noise in the training data"), and would thus provide expectation of better generalization.

The experiments performed utilized a learning system applied to the classification of hand-written alphameric characters known as the Polynomial Method, as described in the previously incorporated Shrinivasan reference.

This system extracts a binary vector of features from a normalized character, and then classifies the character using a matrix multiplication and then selecting the index of the largest component of the product vector as the unknown character's classification.

Shrinivasan described a learning algorithm to determine the above matrix based upon a classical least squares error minimization using a data base of correctly labeled training exemplars and the associated target product vectors, which are simply standard unit vectors with the single non-zero entry in the labeling position.

The features used are, generally, the logical products ("and") of two nearby pixels (hence "polynomial").

The experiments conducted resulted in the creation of accurate classifiers using 1,500 features resembling dilations of the king and knight chess moves in a 30×20 array of pixels. Each pixel could be the center or midpoint of up to eight such chess moves, which gives nearly 4,800 possible features. The feature count gives the size of a matrix which must be inverted; accordingly a relatively equidistributed set of these features was chosen to hold the total to a manageable yet effective number.

The first experiment assumed N labelled character training exemplars for K character classes and F features, with N= 100,000, K= 10, and F= 1,500. The first step in the experiment, utilizing the aforementioned teachings of Shrinivasan, was to construct an F×N matrix, X, whose N columns are the F-element feature vectors of the training exemplars; and a K×N matrix, Y, whose N columns are the K-element "target vectors" corresponding to the correct classifications for the respective training exemplar. A target vector for a character of classification k has value 1 at subscript position k and O's elsewhere.

Next, classification matrix A, which solves, in the least-squares-error sense, $$AX=Y \quad (1)$$

was determined.

This was achieved using the Moore-Penrose pseudo inverse $X^T(XX^T)^{-1}$ of X (since X is not a square, invertible matrix), $$A=YX^T(XX^T)^{-1} \quad (2)$$

Character recognition is achieved using this classification matrix A by extracting a feature vector from an unknown character, calculating $$\bar{y} = A\bar{x} \quad (3)$$

and assigning classification k to the unknown character, where $$\bar{y}_k > \bar{y}_i, \text{ for all } i\text{-}k \quad (4)$$

In the next experiment, this basic Polynomial Method, as outlined above and explained in detail in the incorporated reference, was augmented by an iterative technique inspired by perceptron and adaline training. Simply stated, this augmented methodology strives to determine the training exemplars that are near the boundaries for their particular classification and builds the matrices X and Y shown in (1) and (2) with those boundary cases over-represented.

Although the resulting classifier is constructed using a least-squares-error rule, it functions more like one whose goal is to achieve more correct classifications than one whose goal is to identify and separate classification clusters based on centers of mass. This approach improved the performance of the 1,500-feature classifier from 97.06% correct on the testing data (in the first experiment); to 98.72% (for the second experiment). Or, in other words, the incorrect classification rate is reduced from 2.94% to 1.28%.

Further experiments were conducted using genetic search algorithms to locate suitable classifiers using F=100, 300, and 500 features. The search space is gigantic (e.g., there are $$\binom{1500}{300} \approx 5 \times 10^{144}$$

possibilities using 300 features), so genetic search seemed particularly appropriate.

An "individual" in the genetic "gene pool" is a subset of F; i.e., the 1,500 features already found to be useful for classification purposes utilizing the prior art character recognition techniques described hereinbefore.

The "fitness function" often referred to herein was defined as the classification accuracy (percent correct) of a classifier built using Shrinivasan's one-shot learning technique, where the system is built using a training set consisting of 30,000 hand-written digits and a testing set of 30,000.

As those skilled in the art will readily recognize, fitness evaluation is the principal timing bottleneck in the search process. Several further experiments were conducted to address this problem and are referred to hereinafter as the "GA" (for genetic algorithm), experiments. Before describing these experiments and the results obtained, it should be noted that detailed treatments of the theory of genetic algorithms is set forth in publications entitled "Handbook of Genetic Algorithms", by Lawrence Davis (editor), published by Van Nostrand Reinhold, N.Y., 1991; and "Genetic Algorithms in Search, Optimization and Machine Learning", by D. E. Goldberg, published by Addison-Wesley, New York, 1989. These publications are hereby incorporated by reference.

In the aforementioned GA experiments, "individuals" were represent as a sequence of 1,500 1's and 0's in which the number of 1's is exactly f. Two individuals were chosen to become parents according to their fitness (competition techniques for choosing individuals for parenthood are described hereinafter).

A form of uniform crossover, as described in the aforementioned incorporated Goldberg publication, was used to combine genetic material from the chosen parents to create the children.

In this process, if both parents agree (0 or 1) at some position, the two children will both inherit the value that the parents agree on. If the parents disagree at a position, the two different values are assigned to the two children randomly. The experiments were, however, designed to ensure that each child is created with exactly f 1's.

Parents were selected from the current population of individuals according to their fitness. In the context of the experiments being described, fitness is (as indicated hereinbefore), the performance on a set of testing data of a classifier built using the individual's one bits to select the classifier's features. Individuals were chosen to be parents with a probability that was a "monotonically increasing function of their fitness".

One interpretation of "monotonically increasing function of fitness" used was that individuals were chosen to be parents proportional to their rank when rank-ordered by fitness. This could be implemented by sorting the population according to fitness, and then choosing individuals' ranks by a simulated biased roulette wheel (as described in the aforementioned incorporated Goldberg reference.)

A simpler method, which achieved the same result was to pick two individuals from the population (picking with uniform distribution), and then choosing the one with greater fitness.

In several initial experiments this rule took the form of a random shuffling procedure to select four individual; with the fittest of the first pair and the fittest of the second pair being chosen as the two parents.

Later experiments were generalizations of this first one. For example, shuffle and then select 2t individuals; the fittest of the first t and the fittest of the second t are chosen as the two parents. (The probability theory involved here is as follows: Suppose that a random number from the interval [0, 1] has uniform distribution; i.e., $f(x)=1$. Then, let $x=\max(x_1, x_2)$, where $x_1$ and $x_2$ are chosen independently from the uniform distribution; then the probability distribution for x is $f(x)=2x$. In general, if $x=\max(x_1, x_2, \ldots, x_t)$, then the probability distribution, $f(x)=tx^{t-1}$.)

For very large t, this will degenerate to the choice of the two fittest individuals to serve as parents. This would cause a rapid loss of "genetic material" with a consequent failure to search large portions of the space of all individuals. Experimental results indicated that the quality of the solutions deteriorates with larger t, but, as a trade-off, the speed of reaching good solutions increases.

Reference should be made to Tables A and B of FIGS. 3A and 3B, which give experimental results that will be explained in greater detail hereinafter in conjunction with a summary of results achieved utilizing the methods and apparatus contemplated by the invention.

In addition to the experiments cited hereinabove, experiments were conducted using several different methods for maintaining populations. The notion of distinct generations was used, as well as that of a single, evolving population. Genetic algorithm theory seemed to indicate that these algorithms are sufficiently robust, that almost any approach will give solutions to the optimization problems of equivalent quality; but that some methods may converge to the desired result much faster than others. Some of the experiments contemplated were potentially very time consuming (on the order of weeks), and so it was desirable to search out the rapid techniques. The first four population methods tried were:

(1) Steady state. This was the first technique that was tried. When the two children are created, they replace the two losers of the two two-way competitions that selected the two parents.

(2) Replace two worst. This method was similar to the steady state approach in that there is a single evolving population. However, here the two worst fit individuals of the population were replaced with the two new children (assuring that neither of the parents are one of the two worst performers.)

Both the first and the second method assure that the current fitness champion stays in the population pool.

(3) Simple generational. In this method the notion of "generation" was introduced, where the children of the current population are used to create an entire new population. Here, the current champion can be lost.

(4) Keep best half. This fourth method is a variation on the third. The children of parents in generation n are used to build generation n+1. Then, the union of these two generations is sorted by fitness, and the top (fittest) half of becomes generation n+1. Again, the best performers are assured not to be lost from the population pool.

Regarding fitness testing, what follows is a description of a sequence of experimental set-ups used, and how problems concerning efficiency were addressed.

In order to save training and testing time in the iterated polynomial algorithm, feature vectors (1,500 features per) were extracted from all the training and testing exemplars and cached in disk files. Accordingly, the genetic search program being tested used these "features files" instead of actual characters.

For every genetic individual to be fitness tested, 30,000 feature vectors were read from the training set; the indicated features were extracted to form a training vector of the desired length (generally 300); and the classification weights matrix $A=YX^T(XX^T)^{-1}$, was formed (equation (2)); after which 20,000 characters of the testing set were processed, by similarly extracting the subset of the features and multiplying the smaller vector by A. The fitness for the individual in question was the fraction of correctly classified characters. The resulting fraction was multiplied by 1,000, and then converted to an integer, to represent the fitness. Thus, fitness values in the range 8000 to 9900 were obtained.

It was discovered that the same testing could be achieved if the two matrices, $Z=YX^T$ and $W=XX^T$ were pre-evaluated for the full set of 1,500 features, which are then used in the evaluation of A. The components for evaluation of the A-matrix corresponding to a selected subset of the full feature set is simply the submatrices of these large $Z=YX^T$ and $W=XX^T$ matrices.

This pre-evaluation took one to two hours, depending on the computer chosen and its current load, but it would double the speed for individual fitness evaluation. When the development of this technique stabilized, these two arrays could be cached on disk, with only the I/O cost as overhead.

The one-shot training (Shrinivasan's algorithm) using 30,000 training exemplars and 1,500 features resulted in a classifier with 97% accuracy on the 20,000 character testing set. The genetic search was able to find feature subsets of size 300 that performed slightly better on this testing set. The one caveat was that genetic hill-climbing uses a fitness measure which is derived using what was called the "testing set". This set became intimately involved with (genetic) training, although the individual elements do no directly affect the classifier being built.

It was hoped that using the good small subset of features iteratively in the polynomial training algorithm that an even better classifier could be achieved. This hope did not materialize; the one-shot trained A-matrix was the best that could be achieved using the good small subset of features iteratively in the polynomial training algorithm.

What had started out as simply a time saving measure-caching the large matrices-suggested the techniques contemplated by (and achievable by using) the invention.

In particular, it was discovered that the two matrices ($Z=YX^T$ and $W=XX^T$) developed by, for example, the iterative polynomial training technique (and in fact by any other techniques, such as the one shot approach taught in the incorporated Shrinivasan reference); were valuable in finding the desired reduced feature subset and classifiers contemplated by the invention. In particular, re-running the training yielded a 98.71% correct character classification rate; then saving the two large matrices, and using them with a genetic search successfully yielded a set of 300 of the 1,500 features that resulted in a 98.8% correct character classification rate (with the same caveat as expressed hereinbefore).

In summary, after preliminary experiments had been tried, the use of the data mentioned above was settled upon; namely the arrays $Z=YX^T$ and $W=XX^T$ that were a by-product of the training session of the polynomial algorithm which produced the digits classifier whose performance was 98.71%.

It was determined that a continuous population evolution rather than explicitly separate generations was desirable (separate generations made children of good performers wait too long to have good children of their own). And, the strategy of always replacing the two least fit individuals whenever two new children were produced worked best.

The goal was a classifier which used only 300 of the 1,500 features. The available parameters were the population size, the parent-choosing method, and the mutation rate.

Population sizes of 100, 200, and 300 were tried. A population of 100 converged rapidly, but did not achieve the best result possible; 200 was better than 100; and 300 worked marginally better than 200, but took a long time to find the performers being sought.

Parents were selected using the "best of t," taking two disjoint subsets of t individuals and choosing the most fit of each subset to be the parents. Larger values of t heavily skew the distribution to the right, causing rapid convergence combined with a degradation of the fitness of the individual converged to t=3 seems to be the optimal point to trade off these two concerns.

Figure 2:
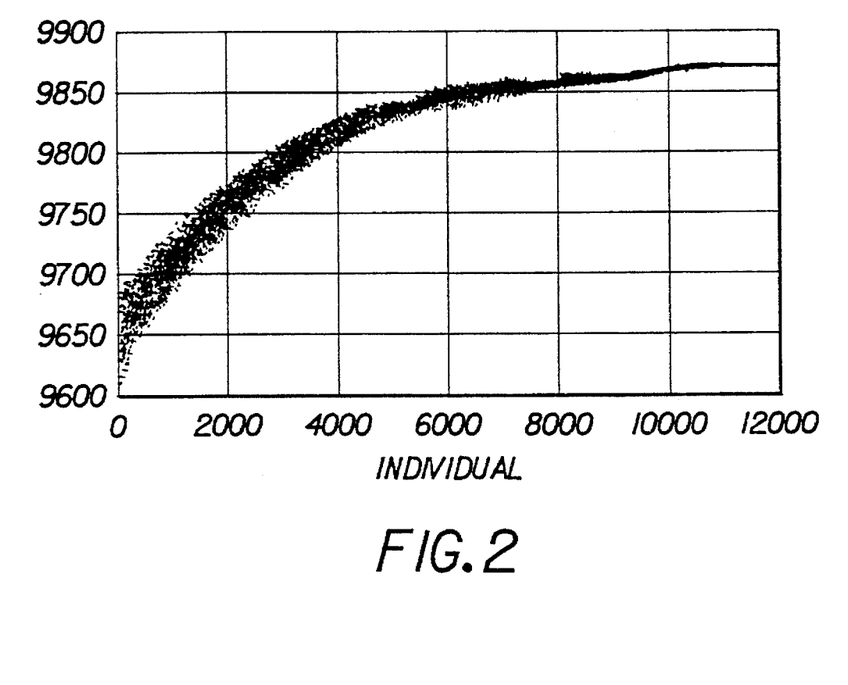
FIG. 2 depicts the fitness of individuals, encountered using a genetic search process, versus number of individuals encountered (a measure of time), in an illustrative search for the best 300 element subset of a 1,500 element feature set, using the teachings of the invention.

Reference should now be made to FIG. 2 which shows the hill-climbing achieved by the genetic algorithm as a population of 300 individuals was evolved. Parent selection was performed by locating the most fit in two disjoint three-member competitions ("best of three"). The two new children always replaced the two least fit individuals in the current population.

Figure 3A:
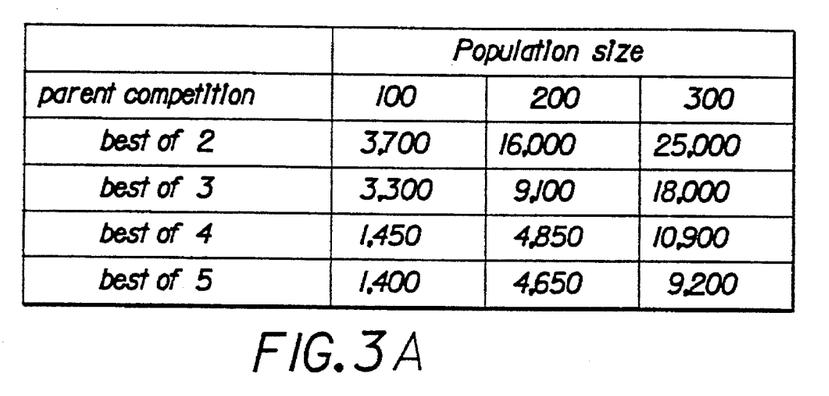
FIGS. 3A, 3B, 3C depict, in the form of Tables A, B and C, the results of several experiments employing genetic search techniques to locate a feature subset satisfying the objects of the invention.
Figure 3B:
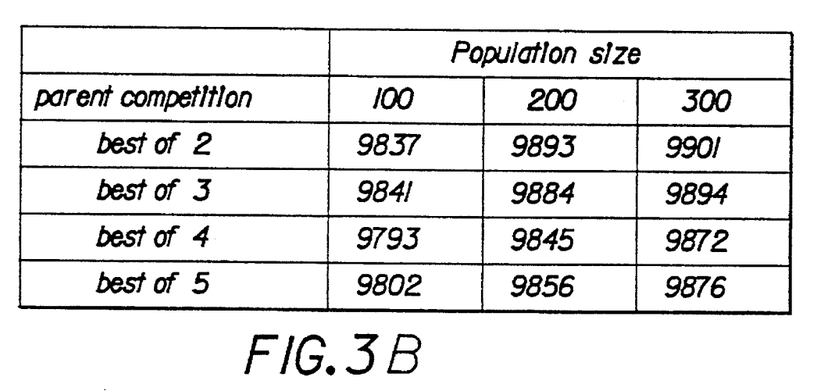
Figure 3C:
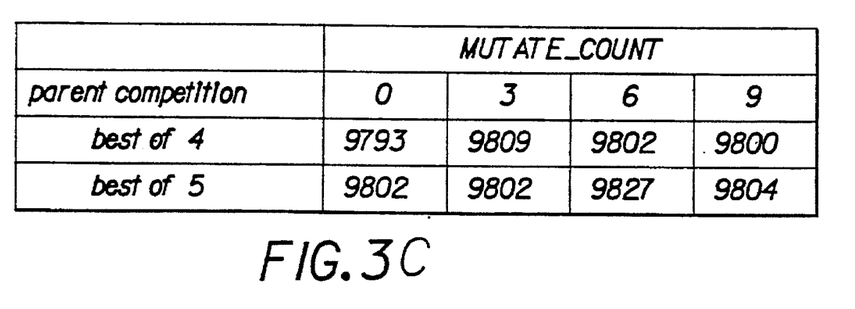

As indicated hereinbefore, Tables A and B, shown in FIGS. 3A and 3B, indicate the results of several of the aforementioned experiments. In particular, Table A depicts the number of individuals evaluated until convergence, showing various parent competition strategies employed for various population sizes. Table B shows the fitness of the best individual discovered; again showing various parent competition strategies employed for various population sizes.

It should be noted that Tables A and B do not show the monotonic results as described hereinabove. The specific results depend, to some extent, on the outcome of the pseudo-random-number used (drand48()), and several runs with different random seeds for each parameter would presumably smooth out these artifacts. The approach taken during the experiments was to sample the parameter space as widely as possible rather than to repeat the experiments for fixed parameters.

It should also be noted that experiments with mutation were conducted as part of the genetic algorithm search technique used by the preferred embodiment of the invention.

The mutation operator was defined such that after two new children were created, mutation would be performed for a specified number of times (referred to herein as the "MUTATE.COUNT"). A single mutate step was defined to consist of randomly choosing two bits in the string of length 1,500 and interchanging their values. The probability that a single mutate will actually modify an individual is 0.32.

With a MUTATE.COUNT of three to nine, slightly better individuals could be discovered, and to discover high performing individuals in approximately the same time as it took to find the best (and converge) with no mutation. These results are summarized in Table C shown in FIG. 3C. where fitness of the best individual after 1,500 evaluations using various levels of mutation is shown. It should be noted that when mutation is used, the search procedure never "converges."

A MUTATE.COUNT of 30 appeared to completely spoil hill climbing. Any successes with such a high rate of mutation seems to be attributable to nothing more than luck.

Figure 4:
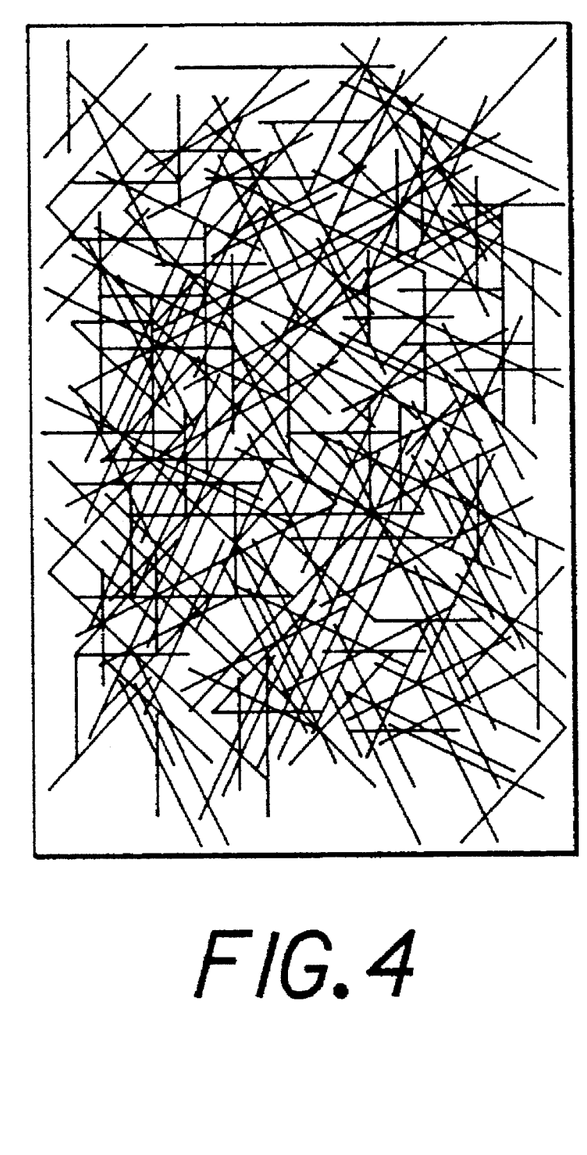
FIG. 4 depicts the 300 features of the best feature subset (of a 1,500 feature set) located utilizing one of the processes contemplated the invention.

Finally, FIG. 4 shows the 300 features of the best feature subset located utilizing the teachings of the invention. Each depicted feature is the logical product of two factors, where each factor is the logical sum of three pixels. The three pixels' centers are a scaled up version of a chess king's or knight's move. FIG. 4 shows the chosen "chess moves" as line segments connecting the two centers.

Reference should now be made to FIG. 5 which, as indicated hereinbefore, depicts (in the form of a flow chart) an illustrative process for constructing the weights matrix A' in accordance with the teachings of the invention.

The aforementioned alternate characterization of the invention will now be presented with reference to FIG. 5, where the overall process used in realizing this aspect of the invention is shown as steps 0–3 (coupled by solid lines); with details of the various steps being shown to the side of FIG. 5 by blocks connected by dotted lines. Both the generalized steps and the details associated with each step will be explained hereinafter.

Step 0, shown in the FIG. 5 flow chart at block 500, is a preparatory step performed (for example) by the aforementioned Polynomial Method. Matrices X, Y, and A are formed using such prior art teachings. In particular, X is a F×N matrix whose columns are feature vectors;

Y is a K×N matrix whose columns are target vectors; and $A = (YX^T)(XX^T)^{-1}$ is a K×F matrix; where F is the number of features—generally around 1,500;

N is the number of training exemplars weighted by iterated multiplicity; and

K is the number of classifications—10 for digits, 26 for letters.

Next, two matrices are derived from X and Y (using, for example, the Polynomial Method, the Iterated Polynomial Method, etc.), and maintained. These matrices, according to the invention, are:

$Z = YX^T$; a K×F matrix; and $W = XX^T$; an F×F matrix.

The two matrices Z and W, after being saved, are passed on to a genetic algorithm for further processing.

FIG. 5 goes on to depict step 1, shown at block 501, which is made up (for the illustrative process being described with reference to FIG. 5) of two steps; step 1.1 and step 1.2 shown at blocks 502 and 503 of FIG. 5, respectively.

The illustrative process calls for the formation of an initial "population" of P (P is generally in the range 100–300) subsets, called "individuals" (at step 1.1; block 502 of FIG. 5), of size f, where f<<F. For example, as indicated hereinbefore, experiments were performed with F=1500 and f=300); each such subset being chosen randomly.

The illustrative process then calls for evaluating the "fitness" of each individual at step 1.2 (block 503 of FIG. 5).

Those skilled in the art will recognize that if a suitable subset (i.e., one that can be used to build a classification weights matrix having suitable performance characteristics using the individual evaluated) is found at step 1.2 (as determined at block 504), the depicted process can successfully be terminated (as shown by path A leading directly to step 3, to be described hereinafter).

FIG. 5 goes on to show that step 2 (shown at block 505 of FIG. 5 of the depicted illustrative process), is iterated (see loop 550 in FIG. 5) until a stopping condition is met, as will be described in more detail hereinafter with reference to step 2.1 (block 506 in FIG. 5).

Next, the illustrative process calls for randomly select two small, disjoint sets of individuals (as will be described in greater detail hereinafter with reference to step 2.2, shown at block 507).

The most "fit" of each subset to serve as "parents" is then determined, followed by (at step 2.3; FIG. 5 block 508), the formation of two "children" from the parents.

An optional step (shown as step 2.4, at block 509 of FIG. 5, whenever mutation is employed as part of the search process as described previously herein), is then to "mutate" the children, determine their fitness, and enter the new children into the population displacing the two least fit individuals (this maintains a population of fixed size P).

A test for a process termination condition having been met is shown at block 510 (i.e., after the population has been modified). Process (search) termination conditions include, for example, a step 2 stopping condition based on the evaluated fitness of an individual (i.e., a step 2.1 type stopping condition), or a stopping condition based on some other criteria, such as length or search, etc.

Finally, at step 3 (block 511 of FIG. 5); whenever a search termination condition is determined to exist; the most fit individual found is reported (as described hereinafter with reference to step 3.1; block 512 of FIG. 5) and the illustrative process is terminated.

It should be noted that, with reference to illustrative step 1.1, an "individual", which is a subset of size f of a set of size F, is normally represented in the usual manner as a binary vector of length F with exactly f non-zero entries.

For convenience of manipulation, this vector is usually represented as F unsigned characters (bytes). Specifically, S is an individual means that $S_i$, for i=1, ... F is a one-byte quantity of value 0 or 1, and $$\sum_{i=1}^{F} S_i = f.$$

With reference to step 1.2 (fitness evaluation of an individual S); using the arrays W and Z and the subset S, form two new arrays:

W', an f×f array whose rows and columns are the rows and columns of W selected by the subset S; and Z', a K×f array whose columns are the columns of Z selected by S.

These two arrays may then be used to form the classifier being evaluated, namely A', where $$A'=Z' W'^{-1}.$$

The classifier associated with the subset S is the matrix A'. This system may then be tested by using A' to classify the exemplars in a "testing set". The "fitness of S" is the percentage of this testing set that A classifies correctly.

The feature vectors of the testing set are kept in length F. In order to multiply each such feature vector by A', the subset S is used to extract a feature vector of length f.

With respect to step 2.1, experience has shown that the classifier based on the subset of size f should have fitness nearly that of the original classifier that uses F features. The system may terminate when a classifier with such performance has been achieved.

With respect to step 2.2 (tournament selection for parents), parent selection tournament sizes, t, are (for the illustrative example being presented herein), in the range t=2 to t=5. This size is fixed for a given run of the genetic algorithm. Next, a standard shuffling method is used to randomly permute a list containing the numbers 1 ... P (only the first 2t numbers of such a permutation need to be established.) The first t numbers of this permutation are used to select the individuals for the tournament for the first parent; the next t numbers for the tournament for the second parent.

Step 2.3 relates to the forming of two children from the two parents. To form two children, C' and C" from two parents S' and S": For each index i, such that $S'_i=S"_i$, let $C'_i=C"_i=S'_i$; For each index i, such that $S'_i \neq S"_i$, let $C'_i=0$ or 1, chosen randomly, and let $C"_i=1-C'_i$; subject to the conditions that, at termination of children creation:

$$\sum_{i=1}^{F} C'_i = \sum_{i=1}^{F} C"_i = f$$

With respect to step 2.4 (mutation), to mutate an individual, C, choose two positions, i and j, such that 1<i<j<F, and interchange the values of $C_i$ and $C_j$. Perform this step an arbitrary number of times (e.g., ten times) for each created individual. The number of times is fixed, denoted MUTATE-.COUNT.

Finally, with respect to step 3.1 (reporting), the subset $S_j$ and the corresponding matrix A' formed for the most successful individual along with its fitness is reported as the final output of the procedure depicted in FIG. 5.

As for the apparatus contemplated by the invention, those skilled in the art will readily appreciate that the prior art apparatus depicted in FIG. 1, may be transformed into apparatus suitable for practicing the instant invention, by utilizing programming techniques, well within the abilities of those skilled in the art, to implement the novel processes taught hereinbefore.

All of the requisite data that needs to be processed using the techniques described herein, may be readily made available to (or be stored within) computer 103 (of FIG. 1), using the teachings of, for example, the incorporated Shrinivasan reference, or the incorporated copending patent application.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

In view of the above it is, therefore, to be understood that the claims appended hereto are intended to cover all such modifications and variations which fall within the true scope and spirit of the invention.

What is claimed is:

1. A method for constructing and using a classification weights matrix A' in a pattern recognition system, comprising the steps of:

(a) providing a digital computer with a first set of signals representing a correlation matrix Z between a predetermined set of exemplar feature vectors, each representing the values of a predefined set of F features, and a set of classification target vectors corresponding to said feature vectors;

(b) providing said digital computer with a second set of signals representing the autocorrelation matrix W of said set of exemplar feature vectors;

(c) determining a classification efficiency of selected subsets of said set of F features, wherein said step of determining the classification efficiency for a given subset comprises the steps of:

(c1) utilizing said given subset to construct submatrices of said correlation and autocorrelation matrices;

(c2) forming a weights matrix for a linear discriminator, in the vector space of said given subset of features, as a function of said submatrices, and (c3) testing said linear discriminator weights matrix on a predefined set of exemplars to yield the classification efficiency of said given subset;

(d) searching a space S of f-element subsets of said set of F features, where f is prespecified and less than F, for an f-element subset having a maximum classification efficiency;

(e) selecting one of the f-element subsets in said space, S, as having a maximum classification efficiency as a result of said step of searching;

(f) defining said classification weights matrix A' as the product of submatrix Z' of said correlation matrix Z, and an inverse of submatrix W' of said autocorrelation matrix W, where submatrices Z' and W' are constructed as a function of S;

(g) capturing a pattern to be recognized using an input device; and (h) performing pattern recognition of the pattern captured with the digital computer using said classification weights matrix A'.

2. A method as set forth in claim 1 wherein matrices Z and W are constructed utilizing an iterated supervised training process.

3. A method as set forth in claim 1 wherein said step of searching is performed utilizing a genetic search process.

4. A method as set forth in claim 1 wherein said step of searching is performed deterministically.

5. A method as set forth in claim 1 wherein submatrix Z' is an array whose columns are the columns of Z selected by the subset S and further wherein submatrix W' is an array whose rows and columns are the rows and columns of W selected by subset S.

6. A method as set forth in claim 1 wherein said pattern recognition system is an optical character recognition system and said input device is an optical character capture device.

7. A method as set forth in claim 1 wherein said pattern recognition system is a sonar detection system and said input device is a sonar signal capture device.

8. A method as set forth in claim 1 wherein said pattern recognition system is a finger print identification system and said input device is a finger print scanner.

9. A method as set forth in claim 1 wherein said pattern recognition system is a face print identification system and said input device is a face scanner.

10. A method as set forth in claim 1 wherein said pattern recognition system is a voice print identification system and said input device is a voice capture device.

11. A method for classifying an unclassified pattern input to a pattern recognition system that includes a digital computer, comprising the steps of:

(a) inputting said unclassified pattern to said digital computer in a normalized form from an input device;

(b) constructing, utilizing said digital computer, a classification weights matrix A' for a pattern recognition system, comprising the steps of:

(b1) providing said digital computer with a first set of signals representing a correlation matrix Z between a predetermined set of exemplar feature vectors, each representing the values of a predefined set of F features, and a set of classification target vectors corresponding to said feature vectors;

(b2) providing said digital computer with a second set of signals representing the autocorrelation matrix W of said set of exemplar feature vectors;

(b3) determining a classification efficiency of selected subsets of said set of F features, wherein said step of determining the classification efficiency for a given subset comprises the steps of:

(b31) utilizing said given subset to construct submatrices of said correlation and autocorrelation matrices;

(b32) forming a weights matrix for a linear discriminator, in the vector space of said given subset of features, as a function of said submatrices, and (b33) testing said linear discriminator weights matrix on a predefined set of exemplars to yield the classification efficiency of said given subset;

(c) searching a space of f-element subsets of said set of F features, where f is prespecified and less than F, for an f-element subset having a maximum classification efficiency;

(d) selecting one of the f-element subsets in said space as having a maximum classification efficiency as a result of said step of searching;

(e) defining said classification weights matrix A' as the product of submatrix Z' of said correlation matrix Z, and an inverse of submatrix W' of said autocorrelation matrix W, where submatrices Z' and W' are constructed as a function of said subset having the maximum classification efficiency; and (f) applying A' to the normalized unclassified pattern provided to said computer system in step (a) to recognize and classify said pattern.

12. A method as set forth in claim 11 wherein said pattern recognition system is an optical character recognition system.

13. A method as set forth in claim 11 wherein matrices Z and W are constructed utilizing an iterated supervised training process.

14. A method as set forth in claim 11 wherein said step of searching is performed utilizing a genetic search process.

15. A method for determining a classification efficiency of selected subsets of a set of F features in a pattern recognition system that includes a digital computer provided with a first set of signals representing the correlation matrix Z between a predetermined set of exemplar feature vectors, each representing the values of said predefined set of F features, and a set of classification target vectors corresponding to said feature vectors, and a second set of signals representing the autocorrelation matrix W of said set of exemplar feature vectors, comprising the steps of:

(a) utilizing a given one of said selected subsets to construct submatrices of said correlation and autocorrelation matrices;

(b) forming a weights matrix for a linear discriminator, in the vector space of said given subset of features, as a function of said submatrices;

(c) testing said linear discriminator weights matrix on a predefined set of exemplars to yield the classification efficiency of said given subset;

(d) iteratively performing steps (a)–(c) on said subsets;

(e) selecting one of the subsets responsive to the classification efficiency;

(f) inputting an unrecognized character using an input device; and (g) performing character recognition using the digital computer with a classification matrix formed using the subset selected in step (e).

16. A method as set forth in claim 15 wherein classification efficiency is defined as the percentage of characters in said predefined set of examplars that said linear discriminator weights matrix correctly identifies.

17. A pattern recognition system, comprising:

a programmable digital computer; and an input device coupled to said digital computer and providing a set of patterns to be classified by said system, to said computer in a normalized form;

said programmable digital computer comprising means for constructing a classification weights matrix A' for said system from a first set of signals, available to said computer, representing a correlation matrix Z between a predetermined set of exemplar feature vectors, each representing the values of a predefined set of F features, and a set of classification target vectors corresponding to said feature vectors, and from a second set of signals, available to said computer, representing the autocorrelation matrix W of said set of exemplar feature vectors, and means for performing pattern recognition of unclassified patterns using the classification weights matrix, wherein said means for constructing further comprises:

(c1) means for determining a classification efficiency of selected subsets of said set of F features, wherein said means for determining the classification efficiency for a given subset further comprises:

(c11) means for constructing, utilizing said given subset, submatrices of said correlation and autocorrelation matrices;

(c12) means for forming a weights matrix for a linear discriminator, in the vector space of said given subset of features, as a function of said submatrices, and (c13) means for testing said linear discriminator weights matrix on a predefined set of exemplars to yield the classification efficiency of said given subset;

(c2) means for searching a space of f-element subsets of said set of F features, where f is prespecified and less than F, for an f element subset having a maximum classification efficiency;

(c3) means for selecting one of the f-element subsets in said space as having a maximum classification efficiency as a result of the search performed by said means for searching; and (c4) means for defining said classification weights matrix A' as the product of submatrix Z' of said correlation matrix Z, and an inverse of submatrix W' of said autocorrelation matrix W, where submatrices Z' and W' are constructed as a function of said subset having the maximum classification efficiency.

18. Apparatus as set forth in claim 17 wherein said pattern recognition system is an optical character recognition system.

19. Apparatus as set forth in claim 17 wherein said means for searching is operative to perform a genetic search.

20. A method for constructing and using a classification weights matrix A' in a pattern recognition system that includes a digital computer provided with (a) a first set of signals representing a correlation matrix Z between a predetermined set of exemplar feature vectors, each representing the values of a predefined set of F features, and a set of classification target vectors corresponding to said feature vectors, and (b) a second set of signals representing the autocorrelation matrix W of said set of exemplar feature vectors, comprising the steps of:

(a) forming, using the digital computer, an initial population of P individuals, wherein each individual is a randomly chosen f-element subset of said predetermined set of said set of F features, where f<<F;

(b) evaluating, using the digital computer, a fitness of each individual subset;

(c) determining, using the digital computer, if a stopping condition has been met based on the evaluated fitness of each individual;

(d) defining, using the digital computer, whenever a stopping condition has been met, the individual subset S that satisfies a stopping condition as the most fit individual;

(e) defining, using the digital computer, said classification weights matrix A' as the product of submatrix Z' of said correlation matrix Z, and an inverse of submatrix W' of said autocorrelation matrix W, where submatrix Z' is an array whose columns are the columns of Z selected by subset S, and where submatrix W' is an array whose rows and columns are the rows and columns of W selected by subset S;

(f) inputting an unclassified pattern using an input device; and (g) performing pattern recognition of the unclassified pattern using the digital computer with the classification weights matrix A'.

21. A method as set forth in claim 20 further comprising the step of iteratively performing, so long as one of a set of search termination conditions has not been met, a search, over the space of f-element subsets of said predetermined set of said set of F features, for an individual which satisfies a stopping condition.

22. A method as set forth in claim 21 wherein said set of search termination conditions include stopping conditions that are based on the evaluated fitness of an individual along with stopping conditions that are not based on the evaluated fitness of an individual.

23. A method as set forth in claim 21 wherein said search is a genetic search.

24. A method as set forth in claim 23 wherein said genetic search comprises the steps of:

(a) randomly selecting two disjoint sets of individuals, each consisting of t individuals, where t is<< P, to determine the most fit individual in each disjoint subset to serve as parents in the genetic search;

(b) determining the most fit individual in each disjoint subset to serve as parents;

(c) forming two children from the parents determined in step (b) to be most fit;

(d) evaluating the fitness of the children; and (e) entering the new children into said population displacing the two least fit individuals thereby maintaining the population at fixed size P.

25. A method as set forth in claim 24 further comprising the step of mutating the children prior to performing said step of evaluating the fitness of said children.

* * * * *